United States Patent
Brock et al.

(10) Patent No.: US 10,906,120 B2
(45) Date of Patent: Feb. 2, 2021

(54) METHODS AND APPARATUS TO PROVIDE A CONSISTENT ELECTRODE STATE FOR WELDING

(71) Applicant: Illinois Tool Works Inc., Glenview, IL (US)

(72) Inventors: Maxwell Brock, Appleton, WI (US); Richard Martin Hutchison, Iola, WI (US); Todd Gerald Batzler, Hortonville, WI (US); Peter Mehn, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1140 days.

(21) Appl. No.: 15/179,173

(22) Filed: Jun. 10, 2016

(65) Prior Publication Data
US 2017/0355037 A1 Dec. 14, 2017

(51) Int. Cl.
| | |
|---|---|
| *B23K 9/12* | (2006.01) |
| *B23K 9/133* | (2006.01) |
| *B23K 9/173* | (2006.01) |
| *B23K 9/29* | (2006.01) |
| *B23K 9/095* | (2006.01) |

(52) U.S. Cl.
CPC ............ *B23K 9/125* (2013.01); *B23K 9/0956* (2013.01); *B23K 9/1336* (2013.01); *B23K 9/173* (2013.01); *B23K 9/295* (2013.01)

(58) Field of Classification Search
CPC .............................. B23K 9/125; B23K 9/0956
USPC ............... 219/137.71, 137.7, 137.2; 226/108
See application file for complete search history.

(56) References Cited

U.S. PATENT DOCUMENTS

| | | | |
|---|---|---|---|
| 6,831,251 B1 * | 12/2004 | Artelsmair | B23K 9/1336 |
| | | | 219/137.71 |
| 6,963,048 B2 | 11/2005 | Huismann et al. | |
| 6,969,823 B2 | 11/2005 | Huismann et al. | |
| 6,984,806 B2 | 1/2006 | Huismann et al. | |
| 7,102,099 B2 | 9/2006 | Huismann et al. | |
| 7,138,602 B2 | 11/2006 | Huismann et al. | |
| 7,165,707 B2 | 1/2007 | Huismann et al. | |
| 7,351,933 B2 | 4/2008 | Huismann et al. | |
| 7,364,059 B2 | 4/2008 | Huismann et al. | |
| 7,554,056 B2 | 6/2009 | Huismann et al. | |
| 8,373,094 B2 | 2/2013 | Wells et al. | |
| 8,629,373 B2 | 1/2014 | Kaufman et al. | |

(Continued)

*Primary Examiner* — Tu B Hoang
*Assistant Examiner* — Thomas J Ward
(74) *Attorney, Agent, or Firm* — McAndrews, Held & Malloy, Ltd.

(57) ABSTRACT

Methods and apparatus to provide a consistent electrode state for welding, an example welding-type system includes: a first wire drive to feed an electrode wire through a welding torch; a bidirectional assisting wire drive to advance the electrode wire from a wire supply to the first wire drive; a tension-compression detector to detect a first tension-compression state of the electrode wire; and one or more motor controllers to control the first wire drive and the assisting wire drive to put the electrode wire in a predetermined position relative to the welding torch by: controlling the first wire drive to hold the electrode wire; and controlling the assisting wire drive to advance or retract the electrode wire based on the first tension-compression state to put the electrode wire in a second tension-compression state.

18 Claims, 8 Drawing Sheets

(56) References Cited

U.S. PATENT DOCUMENTS

| | | |
|---|---|---|
| 2005/0056629 A1 | 3/2005 | Huismann et al. |
| 2005/0189335 A1 | 9/2005 | Huismann et al. |
| 2005/0211689 A1 | 9/2005 | Huismann et al. |
| 2006/0226137 A1 | 10/2006 | Huismann et al. |
| 2007/0000893 A1 | 1/2007 | Huismann et al. |
| 2008/0149610 A1 | 6/2008 | Huismann et al. |
| 2008/0217313 A1 | 9/2008 | Huismann et al. |
| 2008/0314876 A1 | 12/2008 | Pinsonneault et al. |
| 2009/0071942 A1* | 3/2009 | Kachline ............ B23K 9/0956 219/74 |
| 2009/0139971 A1 | 6/2009 | Huismann et al. |
| 2009/0242532 A1 | 10/2009 | Huismann et al. |
| 2010/0108654 A1* | 5/2010 | Ulrich ............... B23K 9/1087 219/130.5 |
| 2011/0220629 A1* | 9/2011 | Mehn ................ B23K 9/125 219/136 |
| 2012/0067859 A1 | 3/2012 | Albrecht et al. |
| 2012/0145689 A1 | 6/2012 | Hillen et al. |
| 2014/0027429 A1* | 1/2014 | Chantry ............. B23K 9/124 219/137.7 |
| 2014/0110386 A1 | 4/2014 | Centner |
| 2017/0050258 A1 | 2/2017 | Hillen et al. |

* cited by examiner

METHODS AND APPARATUS TO PROVIDE A CONSISTENT ELECTRODE STATE FOR WELDING

BACKGROUND

In some types of welding operations involving a wire fed to a welding torch, the wire is driven by multiple wire drives. When performing multiple welds, a consistent arc start condition at the welding torch is desirable for rapid and reliable welding, whether for automated or manual welding.

SUMMARY

Methods and systems are provided for providing a consistent electrode state for welding, substantially as illustrated by and described in connection with at least one of the figures, as set forth more completely in the claims.

DETAILED DESCRIPTION

Figure 1:
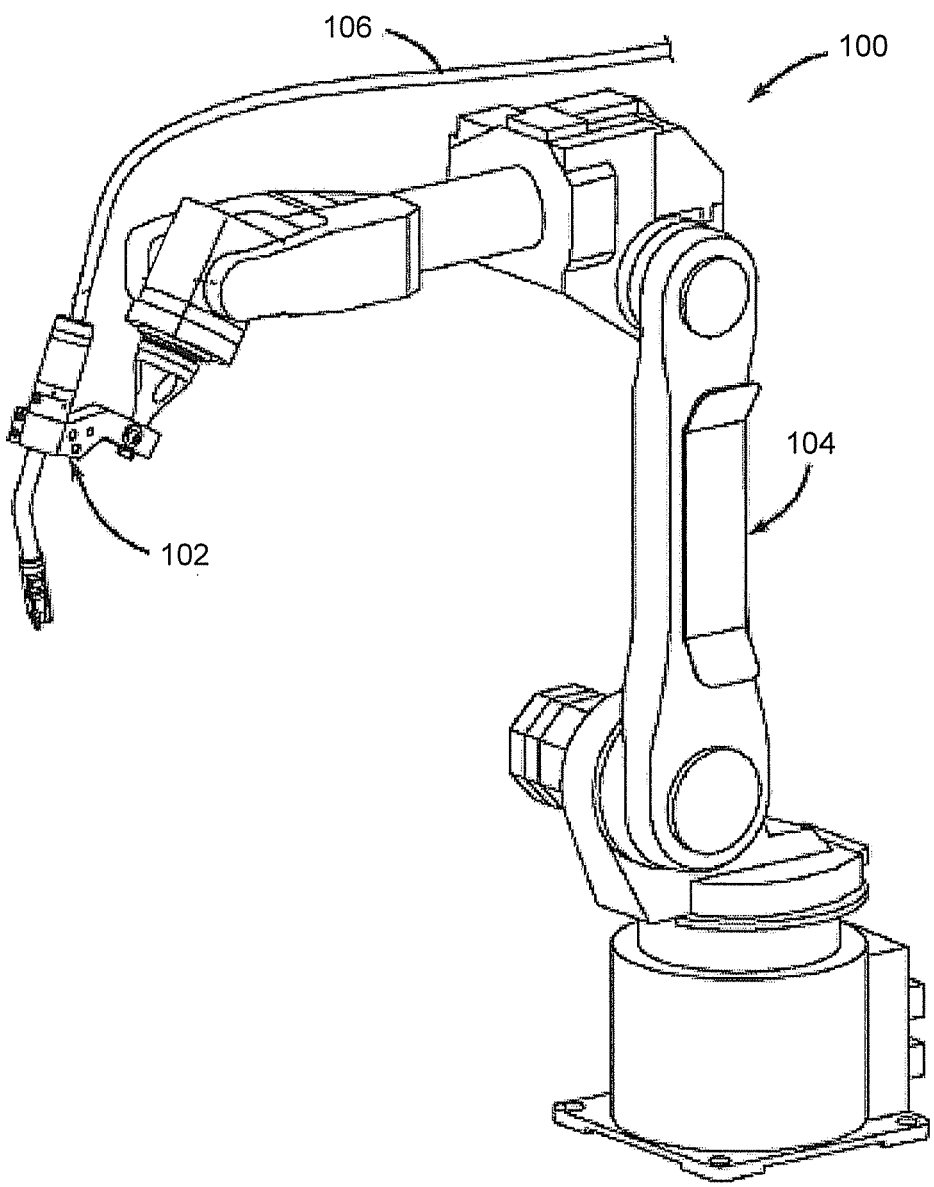
FIG. 1 is a perspective view of an embodiment of a robot welding system having a welding torch coupled to a robotic arm.

Controlled short circuit welding processes involve feeding and retracting a wire electrode with rapid changes in direction. To ensure that the welding electrode (also referred to herein as simple "wire") can quickly move both forward and backward at arc start, mechanical tension and/or compression in the wire should be reduced or eliminated. Disclosed examples take advantage of excess volume between a coaxial gas delivery system and a torch liner to ensure that the wire is capable of make the short duration precision moves required to allow a high quality arc start every time.

Disclosed examples manage the tension and/or compression of the welding electrode when not welding, to help ensure that the welding electrode can easily move in both directions at the next arc start. Some examples move the wire after an arc ending sequence is complete, prior to a next arc start, and/or substantially constantly while not welding.

In some examples, the welding electrode is held in position at the arc end by putting the torch motor drive (e.g., a servo or stepper motor) into a hold position mode. In the hold position mode, the wire drive attempts to hold the rotor in the current position, which effectively results in zero electrode movement at the torch. While the wire is being held in place, an assist motor is used to advance or retract the welding electrode to place the wire in a position in which the wire can freely move in both directions. Once the electrode is in position, the system is ready to begin the next arc.

Some examples use data about wire position using torque, velocity, and/or position feedback from both wire drives. The buffer sensor hardware could reside at either the welding-torch end, or at the assist-motor end of the torch liner. In some examples, the buffer adjust methods disclosed herein could be enabled as a field diagnostic to help troubleshoot feeding issues or system level failures.

Disclosed example welding-type systems include a first wire drive, a bidirectional assisting wire drive, a tension-compression detector, and one or more motor controllers. The first wire drive feeds an electrode wire through a welding torch. The bidirectional assisting wire drive advances the electrode wire from a wire supply to the first wire drive. The tension-compression detector detects a first tension-compression state of the electrode wire. The motor controller(s) control the first wire drive and the assisting wire drive to put the electrode wire in a predetermined position relative to the welding torch by: controlling the first wire drive to hold the electrode wire and controlling the assisting wire drive to advance or retract the electrode wire based on the first tension-compression state to put the electrode wire in a second tension-compression state.

Some example welding-type systems further include a motor torque monitor to monitor a motor torque at one or more of the first wire drive or the assisting wire drive, where the one or more motor controllers identify the second tension-compression state based on the motor torque. Some example welding-type systems further include a tension-compression sensor coupled to the tension-compression detector. The tension-compression sensor includes a marker physically coupled to a wire liner of the electrode wire, one or more first sensors to detect corresponding amounts of compression in the electrode wire when the one or more first sensors detect the marker, and one or more second sensors to detect corresponding amounts of tension in the electrode wire when the one or more second sensors detect the marker. The tension-compression state is based on output values of the one or more first sensors and the one or more second sensors. In some such examples, the one or more first sensors and the one or more second sensors include at least one of a Hall effect sensor, an optocoupler, a potentiometer, a linear variable differential transformer, an inductive proximity sensor, a rotary encoder, or an incremental encoder.

Some example welding-type systems further include a robot controller to control a movement of the welding torch and to indicate to the one or more motor controllers that the movement of the welding torch between welds is completed. The one or more motor controllers control the first wire drive and the assisting wire drive to put the electrode wire in the predetermined position in response to the indication from the robot controller. Some example welding-type systems further include a robot controller to control a movement of the welding torch. The one or more motor controllers control the first wire drive and the assisting wire drive to put the electrode wire in the predetermined position and to maintain the electrode wire in the predetermined position while the welding torch is moved.

In some examples the one or more motor controllers identify the second tension-compression state by controlling the first wire drive and the assisting wire drive to put the electrode wire into a third tension-compression state based on the tension-compression detector. The third-tension compression state includes an upper compression detection limit of the tension-compression detector. The one or more motor controllers identify the second tension-compression state further by controlling the first wire drive to hold the electrode wire, controlling the assisting wire drive to retract the electrode wire and advance the electrode wire and, while retracting and advancing the electrode wire, monitoring a wire drive torque for the assisting wire drive to determine whether the wire drive torque satisfies a wire drive torque threshold. The one or more motor controllers identify the second tension-compression state further by identifying tension compression-states corresponding to tension in the electrode wire and compression in the electrode wire by identifying the tension-compression states when the wire drive torque satisfies the wire drive torque threshold, and setting the second tension-compression state to be between the tension-compression states associated with the wire drive torque satisfying the wire drive torque threshold.

In some examples, the one or more motor controllers, when the electrode wire is in the second tension-compression state, control the first wire drive and the assisting wire drive to advance or retract the electrode wire to set the electrode wire to a first stickout distance at the welding torch and to have the second tension-compression state. In some examples, the one or more motor controllers detect an end of the an electrode wire supply based on detecting a change the first tension-compression state without a change in a characteristic of a wire drive torque of the assisting wire drive. In some examples, the tension-compression detector is coupled to a wire liner adjacent to the assisting wire drive or the first wire drive.

Some disclosed example welding-type systems include a first wire drive, an assisting wire drive, a wire drive monitor, and one or more motor controllers. The first wire drive feeds an electrode wire to a welding torch. The assisting wire drive advances the electrode wire from a wire supply to the first wire drive. The wire drive monitor monitors a characteristic of at least one of the first wire drive or the assisting wire drive. The one or more motor controllers control the first wire drive and the assisting wire drive to put the electrode wire in a predetermined position relative to the welding torch by controlling the first wire drive to hold the electrode wire and controlling the assisting wire drive to advance or retract the electrode wire based on the characteristic of the assisting wire drive to put the electrode wire into a known tension-compression state.

In some examples, the wire drive monitor includes a motor torque monitor to monitor a motor torque at the assisting wire drive, where the one or more motor controllers identify the known tension-compression state based on the motor torque. In some such examples, the motor torque monitor monitors the motor torque by measuring motor current at the assisting wire drive. Some examples further include a robot controller to control a movement of the welding torch and to indicate to the one or more motor controllers that the movement of the welding torch between welds is completed. The one or more motor controllers control the first wire drive and the assisting wire drive to put the electrode wire in the predetermined position in response to the indication from the robot controller.

Some disclosed example welding-type systems further include a robot controller to control a movement of the welding torch, where the one or more motor controllers control the first wire drive and the assisting wire drive to put the electrode wire in the predetermined position and to maintain the electrode wire in the predetermined position while the welding torch is moved. In some examples, the one or more motor controllers, when the electrode wire is in the known tension-compression state, control the first wire drive and the assisting wire drive to advance or retract the electrode wire to set the electrode wire to a first stickout distance at the welding torch and to have the second tension-compression state.

In some examples, the one or more motor controllers detect an end of the an electrode wire supply based on detecting a change in the first tension-compression state without a change in a commanded speed of the assisting wire drive. In some examples, the characteristic comprises at least one of torque, drive current, motor velocity, and motor position, or a motor velocity error.

Disclosed example methods to control a welding-type system include performing an arc welding operation with a welding torch and, at a conclusion of the arc welding operation, detecting a first tension-compression state of an electrode wire being fed to the welding torch, controlling a first wire drive to hold the electrode wire, and controlling an assisting wire drive to advance or retract the electrode wire based on a characteristic of the assisting wire drive to put the electrode wire in a known tension-compression state. Some example methods further include monitoring a motor torque at one or more of the first wire drive or the assisting wire drive, where identifying of the known tension-compression state is based on the motor torque. Some example methods further include controlling the first wire drive and the assisting wire drive to advance or retract the electrode wire to set the electrode wire to a first stickout distance at the welding torch and to have the known tension-compression state.

As used herein, a wire drive includes one or more motors, such as servos or stepper motors, that cooperate to push and/or pull wire in one or more directions.

As used herein, advancing a wire refers to driving the wire in a direction from a wire supply to a welding torch. As used herein, holding a wire refers to neither advancing nor retracting the wire. In some examples, holding the wire is performed passively, by not actively advancing or retracting the wire. In some other examples, holding the wire is performed by actively resisting compression and/or tension on the wire that biases the wire in one direction by applying current to the motor to resist movement of the wire.

As used herein, a tension-compression state refers to a state of an electrode wire, where the state is either in tension, compression, or equilibrium. Equilibrium refers to having neither substantial tension (e.g., measurable tension) nor substantial compression (e.g., measurable compression).

As used herein, the conclusion of an arc welding operation refers to an end of the arc and/or stoppage of the welding power.

FIG. 1 is a perspective view of an embodiment of a robot welding system 100 having a welding torch 102 coupled to a robotic arm 104. As appreciated, the welding torch 102 may be a metal inert gas (MIG) torch or another wire feed torch. In addition, the robotic arm 104 may be coupled to a control system, such as an automated control system for an assembly line. The illustrated system 100 also includes a supply cable 106 coupled to the torch 102. The supply cable 106 may collectively carry a welding current from a welding power supply, a welding wire from a wire package (e.g., spool) coupled to a wire feeder, a shielding gas from a supply tank (e.g., cylinder), and so forth. The supply cable 106 also may carry control signals to the welding torch 102. The welding torch 102 is configured to bend a welding wire in a controlled manner to provide consistent contact and energy transfer within the welding torch 102. The welding torch 102 may include a head, including a nozzle, a diffuser, and/or a contact tip, coupled to a body or handle.

Particularly in robotic welding operations, a consistent arc start is desirable to achieve reliable welds. To this end, an electrode wire used in robotic MIG welding may be configured to have a same stickout distance at the beginning of each welding operation and/or to have a known tension-compression state so as to reliably control the movement of the electrode wire when the weld begins. As the robotic arm 104 is moved between welding operations (e.g., from an end of a first weld to a beginning of a second weld), the electrode wire may be held in place.

Figure 2:
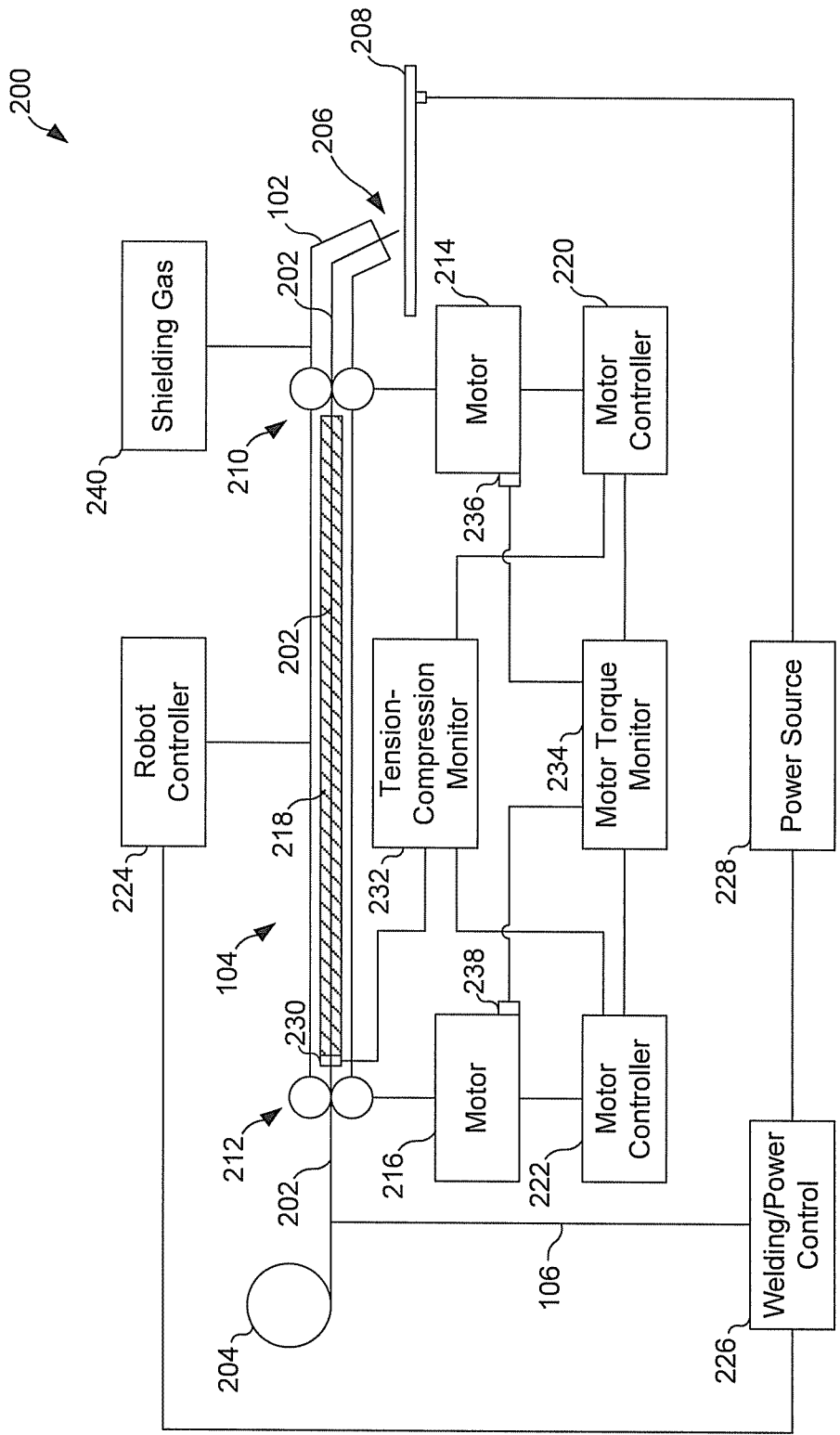
FIG. 2 is a block diagram of an example welding system that may be used to implement the robotic welding system of FIG. 1 to provide a consistent tension-compression state of a welding wire.

FIG. 2 is a block diagram of an example welding system 200 that may be used to implement the robotic welding system 100 of FIG. 1. The example welding system 200 is configured to feed an electrode wire 202 from a wire supply 204 to a welding arc location 206 at a workpiece 208.

The example welding system 200 may implement a robotic welding system 100 and/or a manual welding system in which the welding arc location 206 changes with respect to the wire supply 204, in contrast with stationary welders in which the workpiece 208 is moved and the weld torch 102 remains stationary. For example, a robotic welder and/or a human welder may apply multiple spot welds at various locations on the workpiece 208 prior to conducting a full weld operation.

The welding system 200 performs a controlled short-circuit (CSC) welding process. In CSC welding, the electrode wire 202 is reciprocated by controlling the forward feeding and retraction of the electrode wire 202 using a lead wire drive 210 and an assisting wire drive 212. In the illustrated example, the lead wire drive 210 is closer to the welding arc location 206 and provides high response control of the wire feeding and/or retraction with a high torque motor 214. The assisting wire drive 212 is closer to the wire supply 204 and has a drive motor 216. The electrode wire 202 runs through a wire liner 218 between the lead wire drive 210 and the assisting wire drive 212. The high torque motor 214 is controlled by a motor controller 220 and the drive motor 216 is controlled by a motor controller 222. The lead wire drive 210 and/or the assisting wire drive 212 are bidirectional, in that lead wire drive 210 and/or the assisting wire drive 212 are capable of feeding the electrode wire 202 forward and/or retracting the electrode wire 202.

A robot controller 224 controls movement of the welding torch 102 from one location to another via a robot arm. The robot controller 224 also controls welding/power control circuitry 226 to enable and/or disable the flow of welding power from a power source 228 to the welding torch 102. The welding power/control circuitry 226 closes and/or opens a welding circuit that includes the power source 228, the electrode wire 202, the workpiece 208, and a weld clamp that is electrically connected to the workpiece.

To ensure a consistent arc start and post-arc start wire behavior, the system 200 sets the electrode wire 202 to a specified stickout distance from the weld torch 102 and to a specified tension-compression state (e.g., within a tolerance level of the specified stickout distance and/or the specified tension-compression state). For example, the system 200 may perform an electrode wire reset operation at the end of a welding operation, while the welding torch 102 is being moved between one weld operation location and the next weld operation location, when the welding torch 102 has completed movement to the next welding location 206, and/or in response to a specified command. The state of the electrode wire 202 at the welding torch 102 is set to within a specified tolerance, which enables the welding torch 102 to start the subsequent arc by following an established procedure, which may be programmed into a robot controller 224.

To provide a consistent arc start, the example system 200 includes a tension-compression sensor 230, a tension-compression detector 232, and a motor torque monitor 234. The tension-compression sensor 230 is mechanically, electrically, and/or magnetically coupled to the wire liner 218 to detect a first tension-compression state of the electrode wire 202. The electrode wire 202 has a frictional relationship with the wire liner 218 that is used by the tension-compression sensor 230 to determine a tension-compression state of the electrode wire 202. The wire liner 218 is fixed on the end opposite the tension-compression sensor 230. As the electrode wire 202 is placed under increasing tension by the wire drives 210, 212, a length of the wire liner 218 is extended due to the friction between the electrode wire and the wire liner 218. Conversely, as the electrode wire 202 is placed under increasing compression by the wire drives 210, 212, the length of the wire liner 218 is compressed due to the friction between the electrode wire and the wire liner 218.

An example tension-compression sensor 230 includes a marker that is physically coupled to the wire liner 218 of the electrode wire 202, one or more first sensors that detect corresponding amounts of compression in the electrode wire 202 when the one or more sensors detect the marker, and one or more second sensors that detect corresponding amounts of tension in the electrode wire 202 when the one or more sensors detect the marker. The first and second sensors may be, for example, Hall effect sensors, optocouplers, potentiometers, linear variable differential transformers, inductive proximity sensors, rotary encoders, and/or incremental encoders. The tension-compression sensor 230 is described in more detail below.

The tension-compression detector 232 reads output value(s) from the first and second sensors of the tension-compression sensor 230 and determines the tension-compression state of the electrode wire based on output values of the sensors. In some examples, the tension-compression detector 232 determines and/or stores a target tension-compression state of the electrode wire 202 for use in comparing to a measured tension-compression state of the electrode wire 202 between welds.

The motor torque monitor 234 monitors a motor torque at the assisting wire drive 212 using sensors 236, 238. In some examples, the motor torque monitor 234 measures the motor torque based on the current in the motors 214, 216, which are measured via sensing the current in the motors 214, 216. The illustrated controller 12 is configured to receive feedback from sensors 236, 238 from various portions of the wire drives 210, 212. For example, the feedback from the sensors 236, 238 may include any combination of motor speed, motor current, motor voltage, and/or motor position. In addition, the feedback from the sensors 236, 238 may be input into the tension-compression detector 232 and/or to the motor controllers 220, 222. The feedback from the sensors 236, 238 enables automatic control if the feedback from the sensors 236, 238 indicates an out-of-sync condition between the wire drives 210, 212. For example, if the feedback from the sensor 236 indicates a first wire feed speed of the lead wire drive 210 that is substantially greater than a second wire feed speed of the assisting wire drive 212 as indicated by the feedback from the sensor 238. The motor controller 220 may automatically decrease the first wire feed speed and/or the motor controller 222 may automatically increase the second wire feed speed. Similarly, if the feedback from the sensor 236 indicates that the first wire feed speed of the wire drive 210 is substantially less than the second wire feed speed of the assisting wire drive 212 as indicated by the feedback from the sensor 238, then the motor controller 220 may automatically increase the first wire feed speed and/or the motor controller 222 may automatically decrease the second wire feed speed. The tension-compression detector 232 identifies the target tension-compression state based on the motor torque.

In addition, a shielding gas 240 is coupled to the welding system 200 to supply a shielding gas to the welding arc location 206. In the illustrated embodiment, the shielding gas 240 is coupled to the first wire drive 210, thereby supplying the shielding gas 240 to the welding torch 102, where the shielding gas ejects at the welding arc location 206 about the welding arc being formed between the electrode wire 202 and the workpiece 208. In this manner, the shielding gas 240 shields the molten weld from undesirable contamination.

Figure 3A:
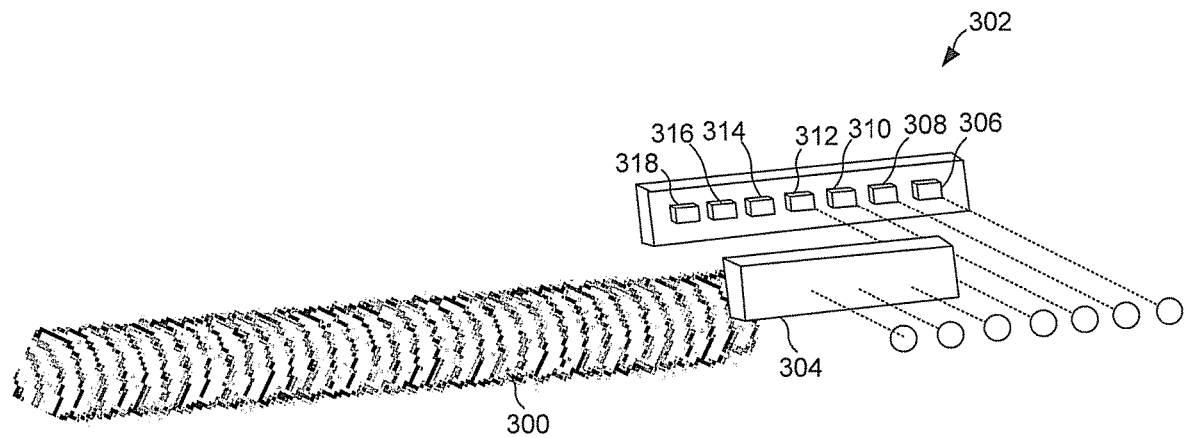
FIGS. 3A and 3B illustrate example wire liners including tension-compression detectors that may be used to implement the welding system of FIG. 2.

FIG. 3A illustrates an example wire liner 300 including a tension-compression sensor 302 that may be used to implement the welding system 200 of FIG. 2. The example tension-compression sensor 302 of FIG. 3A includes a marker 304 and a set of sensors 306-318. While seven sensors 306-318 are illustrated in FIG. 3A, any number of sensors may be used, based on a number of tension-compression states to be separately detectable by the tension-compression sensor 302.

The marker 304 is physically coupled to the wire liner 300. The end of the wire liner 300 opposite the marker 304 is fixed in position, and the end of the wire liner 300 coupled to the flag is permitted to extend and/or retract. As mentioned above, as the electrode wire is put into tension and/or compression, the wire liner 318 extends and/or retracts, causing the marker 304 to move.

The example sensors 306-318 include optocouplers and one or more light sources 320-332. The sensors 306-318 output a signal that indicates whether the marker 304 is blocking the sensor 306-318 from receiving the light from the light source(s) 320-332 or not blocking the sensor 306-318 from receiving the light. By determining which of the sensors 306-318 are receiving light and which of the sensors 306-318 are not receiving light, the tension-compression sensor 302 and/or the tension-compression detector 232 of FIG. 2 can determine the extension and/or retraction of the wire liner 300, which indicates the tension and/or compression on the electrode wire. For example, if fewer of the sensors 306-318 are blocked by the marker 304, the electrode wire is determined to be under more compression and/or less tension than if more of the sensors 306-318 are blocked.

In the arrangement of FIG. 3A, the marker 304 blocks the sensor 306-318 that corresponds to the tension-compression state of the wire, and the sensors 306-318 that correspond to more compressed states. For example, as shown in FIG. 4A, if the tension-compression corresponds to the sensor 312, the marker blocks the sensors 312-318 and does not block the other sensors 306-310. As shown in FIG. 4B, if the tension-compression corresponds to the sensor 308, the marker blocks the sensors 308-318 and does not block the sensor 306. In another example illustrated in FIG. 3B, the sensors 306-318 are offset from the direction of extension and/or retraction of the wire liner 300. As shown in FIG. 4C, if the tension-compression state corresponds to the sensor 318, the marker 304 only blocks the sensor 318 and does not block the other sensors 306-316.

Figure 3B:
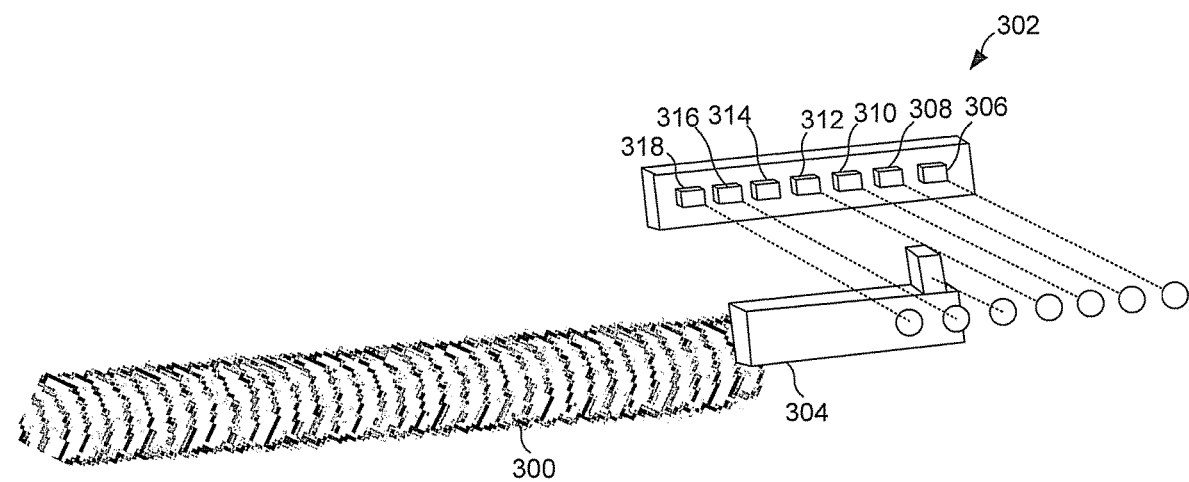
Figure 4A:
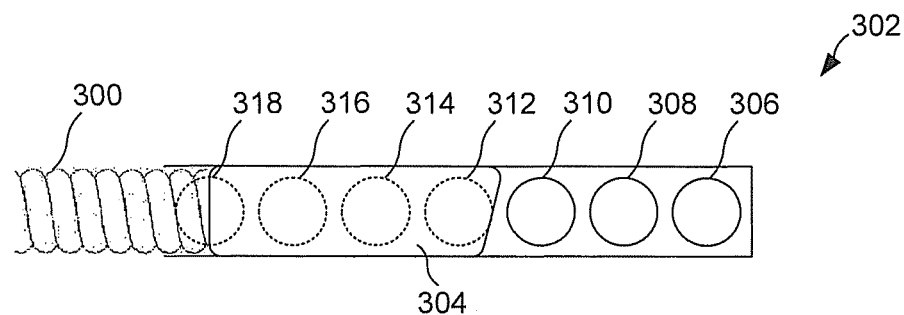
FIGS. 4A, 4B, and 4C illustrate examples of detecting a tension-compression state of the electrode wire using the tension compression detector of FIG. 3.
Figure 4B:
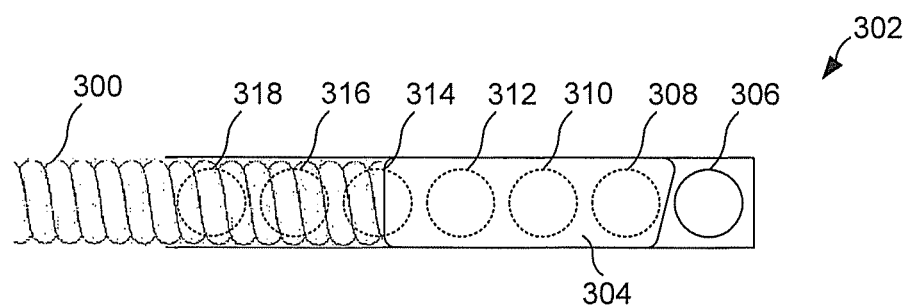
Figure 4C:
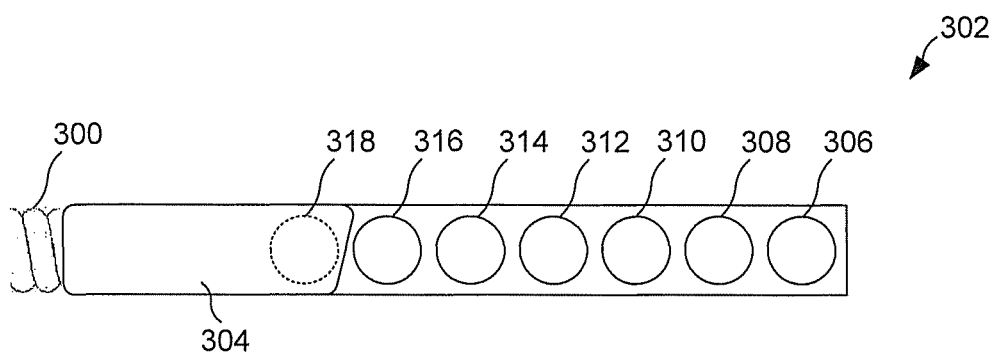

In the example of FIG. 3B, the marker 304 is configured to block one (or two) of the sensors 306-318 that corresponds to the tension-compression state. The example marker 304 of FIGS. 3A and/or 3B is an opaque flag, such as a rigid piece of plastic. However, the marker 304 may be other shapes and/or materials based on the types of sensors used.

In FIG. 3A or FIG. 3B, one of the sensors 306-318 may be assigned or selected to correspond to a target tension-compression state (e.g., a neutral tension-compression state). Based on determining that one of the sensors 306-318 corresponds to a target tension-compression state, ones of the sensors 306-318 that correspond to further extension of the wire liner 300 from the target tension-compression state determine tension states. Conversely, ones of the sensors 306-318 that correspond to less extension of the wire liner 300 from the target tension-compression state determine compression states. If the sensor 312 is selected to identify the target tension-compression state (e.g., if sensors 312, 314, 316, and 318 are blocked by the marker 304, but the sensors 306, 308, and 310 are not blocked), the sensors 306-310 correspond to tension on the electrode wire and the sensors 314-318 correspond to compression of the electrode wire. The sensors 306-318 may be divided into tension sensors, compression sensors, and/or neutral sensors. In some examples, the tension-compression detector 232 of FIG. 2 determines the assignment of the sensors 306-318 as one or more first sensors to detect corresponding amounts of compression in the electrode wire when the one or more first sensors 306-318 detect the marker 304 and/or as one or more second sensors to detect corresponding amounts of tension in the electrode wire when the one or more first sensors 306-318 detect the marker 304.

While the examples of FIGS. 3A and 3B use optocouplers, the tension-compression sensor 302 may be constructed using other types of sensors and/or other types of markers. For example, the sensors 306-318 may be implemented using Hall effect sensors, optocouplers, potentiometers, linear variable differential transformers, inductive proximity sensors, rotary encoders, and/or incremental encoders. While seven sensors 306-318 are illustrated in FIGS. 3A and 3B, any number of sensors may be used, based on a number of tension-compression states to be separately detectable by the tension-compression sensor 302.

Figure 5:
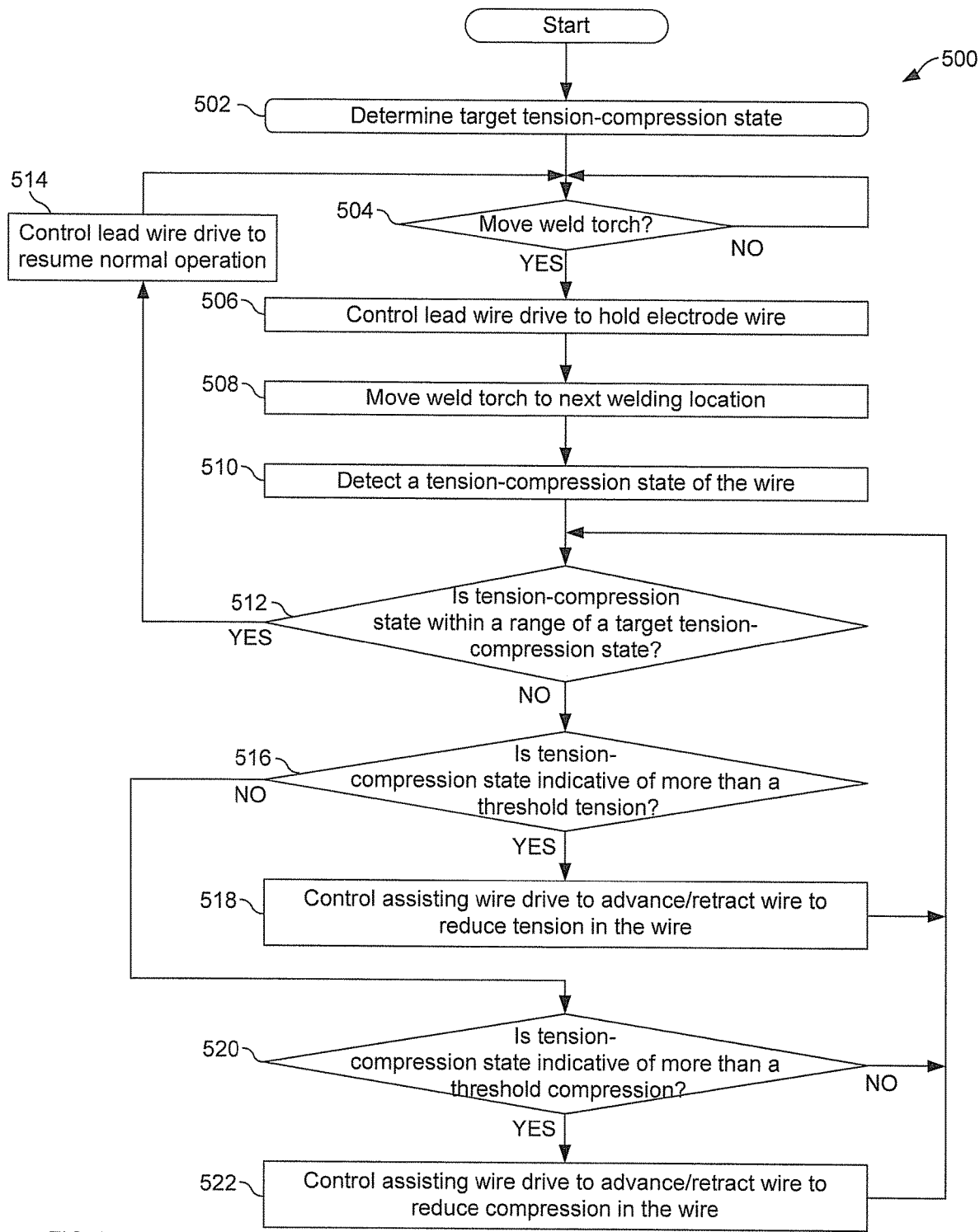
FIG. 5 is a flowchart representative of example machine readable instructions which may be executed to implement the example robotic welding system of FIG. 2 to provide a consistent tension-compression state of a welding wire.

FIG. 5 is a flowchart representative of example machine readable instructions 500 which may be executed to implement the example robotic welding system 200 of FIG. 2 to provide a consistent tension-compression state of a welding wire such as the electrode wire 202 of FIG. 2.

In block 502, the tension-compression detector 232 determines a target tension-compression state. For example, the tension-compression detector 232 may determine which of the sensors 306-318 of FIG. 3A corresponds to a neutral tension-compression state. The target tension-compression state may change from time to time, such as when the wire liner 218 is replaced. Example instructions to implement block 502 are described with reference to FIG. 9.

In block 504, the robot controller 224 determines whether to move the welding torch 102. For example, the robot controller 224 may move the welding torch 102 between welding operations. In some other examples, the tension-compression detector 232 may identify that the welding torch 102 is being moved manually while a weld is not occurring by monitoring for changes in the tension-compression state via the tension-compression sensor 230. If the welding torch 102 is not moved (block 504), control loops to block 504.

When the welding torch 102 is moved (block 504), at block 506 the motor controller 220 controls the lead wire drive 210 to hold the electrode wire 202 in position. At block 508, the robot controller 224 moves the welding torch 102 to the next welding location (while the lead wire drive 210 holds the electrode wire 202 in position). At block 510, the tension-compression sensor 230 and/or the tension-compression detector 232 detect a tension-compression state of the electrode wire 202. For example, the tension-compression detector 232 may determine which of the sensors 306-318 are blocked by the marker 304 of FIG. 3A.

At block 512, the tension-compression detector 232 determines whether the tension-compression state is within a range of a target tension-compression state. If the tension-compression state is within the range of the target tension-compression state (block 512), at block 514 the motor controller 220 controls the lead wire drive 210 (e.g., the motor 214) to resume normal operation and control returns to block 504.

When the tension-compression state is within the range of the target tension-compression state (block 512), at block 516 the tension-compression detector 232 determines whether the tension-compression state is indicative of more than a threshold tension. If the tension-compression state is indicative of more than a threshold tension (block 516), at block 518 the motor controller 222 controls the assisting wire drive 212 (e.g., controls the motor 216) to advance or retract the electrode wire 202 (while lead wire drive 210 holds the electrode wire 202) to reduce the tension in the electrode wire 202. In the example of FIG. 2, the assisting wire drive 212 advances the electrode wire 202.

If the tension-compression state is not indicative of more than a threshold tension (block 516), at block 520 the tension-compression detector 232 determines whether the tension-compression state is indicative of more than a threshold compression. If the tension-compression state is indicative of more than a threshold compression (block 520), at block 522 the motor controller 222 controls the assisting wire drive 212 (e.g., controls the motor 216) to retract or advance the electrode wire 202 (while lead wire drive 210 holds the electrode wire 202) to reduce the compression in the electrode wire 202. In the example of FIG. 2, the assisting wire drive 212 retracts the electrode wire 202 to reduce compression.

After controlling the assisting wire drive 212 to advance or retract the electrode wire 202 (block 518 or block 522), or if the tension-compression state is not indicative of more than a threshold compression (block 520), control returns to block 512 to check the tension-compression state.

As described above, the instructions 500 may be executed to repeatedly monitor and/or adjust the tension-compression states of the electrode wire 202 to ensure a consistent arc start for multiple welds.

While the example instructions 500 perform the adjustment at the end of a welding operation. Alternatively, the electrode adjustment process may be done prior to arc start (e.g., during a preflow stage of the weld). However, because the positioning operation could take a short but potentially noticeable time to complete, the process could have an undesirable impact on overall weld cycle time.

It is worth noting that this operation could be, and probably will be, performed continuously to help hold the wire in a 'low force state' at all times to help manage loading effects as the operator (or robot) moves the torch from one weld joint to another. Since a welding sequence typically consists of performing a weld, then doing a torch move to the next position, it would be preferred to combine the wire repositioning due to the end state of the weld and any changes due to torch repositioning into a single process.

Figure 6:
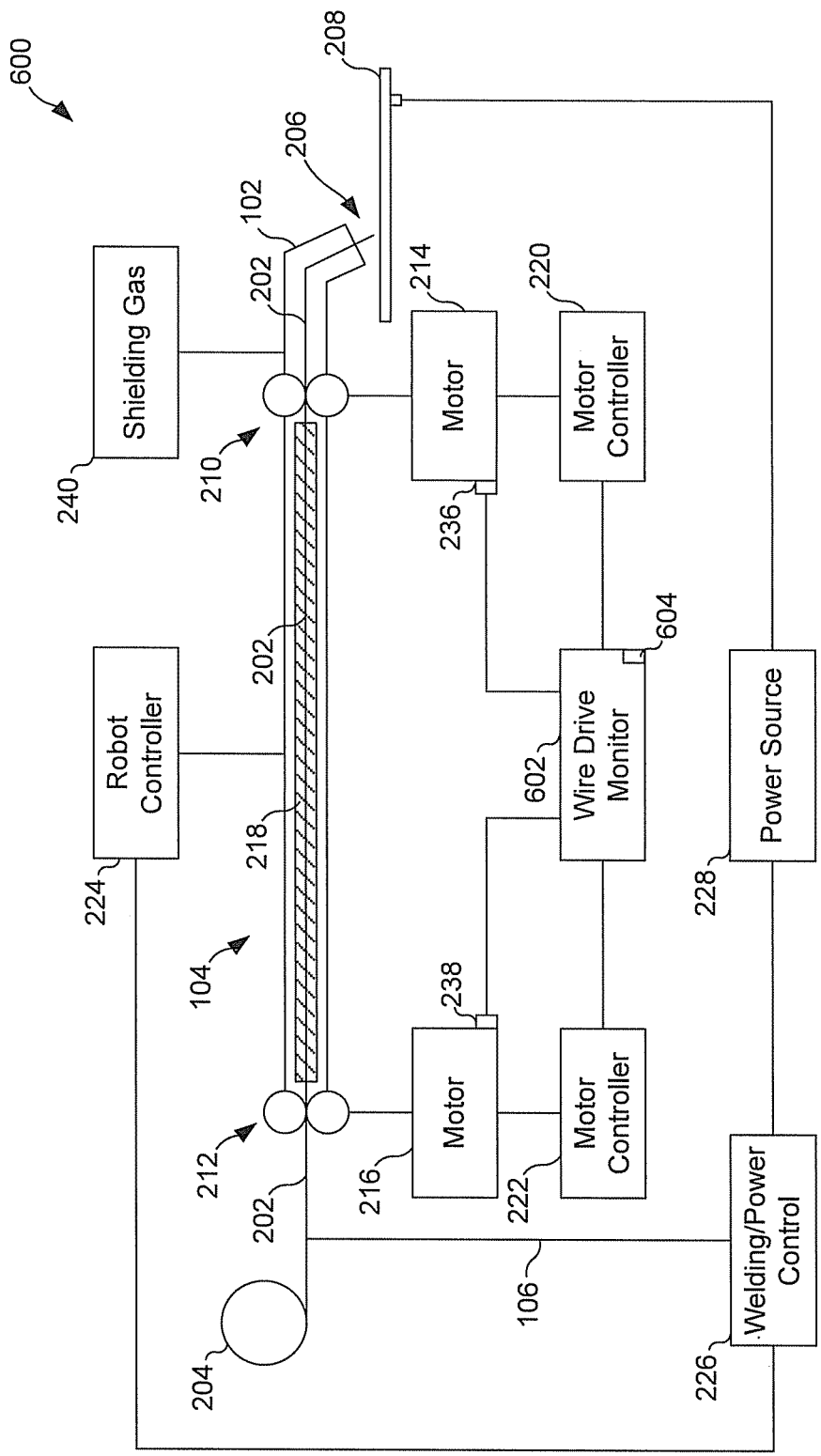
FIG. 6 is a block diagram of an example welding system that may be used to implement the robotic welding system of FIG. 1 to provide a consistent tension-compression state of a welding wire.

FIG. 6 is a block diagram of another example welding system 600 that may be used to implement the robotic welding system 100 of FIG. 1 to provide a consistent tension-compression state of an electrode wire 202. The example welding system 600 is similar to the welding system 200 of FIG. 2. However, the example welding system 600 omits the tension-compression sensor 230 and the tension-compression detector 232. Instead, the example welding system 600 monitors characteristics of the motors 214, 216 using a wire drive monitor 602.

Similar to the example system 200 of FIG. 2, the welding system 600 sets the electrode wire 202 to a target stickout distance and/or a target tension-compression state when the welding torch 102 is moved between welds. The lead wire drive 210 feeds an electrode wire to the welding torch and the assisting wire drive 212 advances the electrode wire 202 from the wire supply 204 to the lead wire drive 210.

The wire drive monitor 602 monitor characteristic(s) of the lead wire drive 210 and/or the assisting wire drive 212. Example characteristic(s) that may be monitored by the wire drive monitor 602 torque, drive current, motor velocity, motor position, and/or motor velocity error. Motor velocity error refers to a difference between commanded velocity of the lead wire drive 210 or the assisting wire drive 212 and the actual velocity (e.g., measured velocity) of the lead wire drive 210 or the assisting wire drive 212.

The example wire drive monitor 602 includes a motor torque monitor 604 to monitor motor torque at the assisting wire drive 212. The motor torque monitor 604 may monitor the motor torque by measuring, for example, motor current at the assisting wire drive 212 via the sensor 238.

The motor controllers 220, 222 control the first wire drive and the assisting wire drive to put the electrode wire 202 in a predetermined position and/or tension-compression state relative to the welding torch 102. In some examples, the motor controller 220 controls the first wire drive to hold the electrode wire 202. The motor controller 222 then controls the assisting wire drive 212 to advance or retract the electrode wire 202 based on the characteristic of the assisting wire drive 212 to put the electrode wire 202 into a known tension-compression state. In some examples, the wire drive monitor 602 and/or the motor controllers 220, 222 identify the known tension-compression state based on the motor torque measured by the motor torque monitor 604.

In some examples, the motor controllers 220, 222 detect an end of the electrode wire supply 204 (e.g., when the wire supply 204 is exhausted of the electrode wire 202) based on detecting a change in the first tension-compression state without a change in a commanded speed of the assisting wire drive. For example, if the wire drive monitor 602 detects that the torque of the assisting wire drive 212 decreases without a change in the feed speed, the example motor controller 222 determines that the end of the electrode wire 202 has been reached at the assisting wire drive 212.

Figure 7:
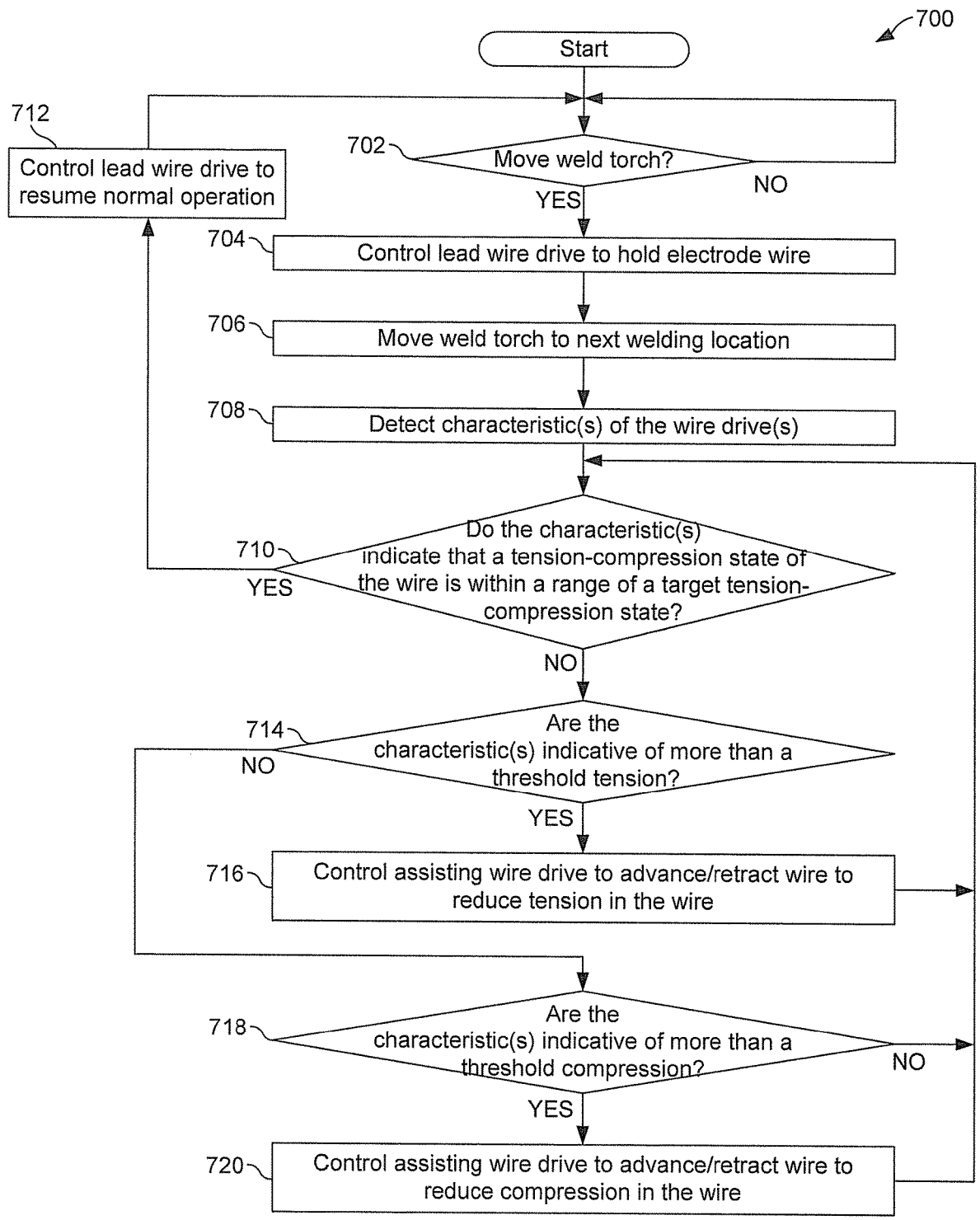
FIG. 7 is a flowchart representative of example machine readable instructions which may be executed to implement the example robotic welding system of FIG. 6 to provide a consistent tension-compression state of a welding wire.

FIG. 7 is a flowchart representative of example machine readable instructions 700 which may be executed to implement the example robotic welding system 600 of FIG. 6 to provide a consistent tension-compression state of the welding wire 202.

In block 702, the robot controller 224 determines whether to move the welding torch 102. For example, the robot controller 224 may move the welding torch 102 between welding operations. In some other examples, the wire drive monitor 602 may identify that the welding torch 102 is being moved manually while a weld is not occurring by monitoring for changes in the tension-compression state via the tension-compression sensor 230. If the welding torch 102 is not moved (block 702), control loops to block 702.

When the welding torch 102 is moved (block 702), at block 704 the motor controller 220 controls the lead wire drive 210 to hold the electrode wire 202 in position. At block 706, the robot controller 224 moves the welding torch 102 to the next welding location (while the lead wire drive 210 holds the electrode wire 202 in position). At block 708, the wire drive monitor 602 detects the characteristic(s) of the wire drive(s) 210, 212. For example, the wire drive monitor 602 may monitor the motor torque, the motor current, the motor positions, and/or the motor velocity.

At block 710, the wire drive monitor 602 determines whether characteristic(s) indicate that a tension-compression state of the electrode wire 202 is within a range of a target tension-compression state. If the characteristic(s) indicate that a tension-compression state of the electrode wire 202 is within a range of a target tension-compression state (block 710), at block 712 the motor controller 220 controls the lead wire drive 210 (e.g., the motor 214) to resume normal operation and control returns to block 702.

When the characteristic(s) indicate that a tension-compression state of the electrode wire 202 is within a range of a target tension-compression state (block 710), at block 714 the wire drive monitor 602 determines whether the characteristic(s) are indicative of more than a threshold tension. If the wire drive monitor 602 determines that the characteristic(s) are indicative of more than a threshold tension (block 714), at block 716 the motor controller 222 controls the assisting wire drive 212 (e.g., controls the motor 216) to advance or retract the electrode wire 202 (while lead wire drive 210 holds the electrode wire 202) to reduce the tension in the electrode wire 202. In the example of FIG. 2, the assisting wire drive 212 advances the electrode wire 202.

If the wire drive monitor 602 determines that the characteristic(s) are not indicative of more than a threshold tension (block 714), at block 718 the wire drive monitor 602 determines whether the characteristic(s) are indicative of more than a threshold compression. If the characteristic(s) are indicative of more than a threshold compression (block 718), at block 720 the motor controller 222 controls the assisting wire drive 212 (e.g., controls the motor 216) to retract or advance the electrode wire 202 (while lead wire drive 210 holds the electrode wire 202) to reduce the compression in the electrode wire 202. In the example of FIG. 2, the assisting wire drive 212 retracts the electrode wire 202 to reduce compression.

After controlling the assisting wire drive 212 to advance or retract the electrode wire 202 (block 716 or block 720), or if the characteristic(s) are not indicative of more than a threshold compression (block 718), control returns to block 710 to check the tension-compression state.

As described above, the instructions 700 may be executed to repeatedly monitor and/or adjust the tension-compression states of the electrode wire 202 to ensure a consistent arc start for multiple welds.

Figure 8:
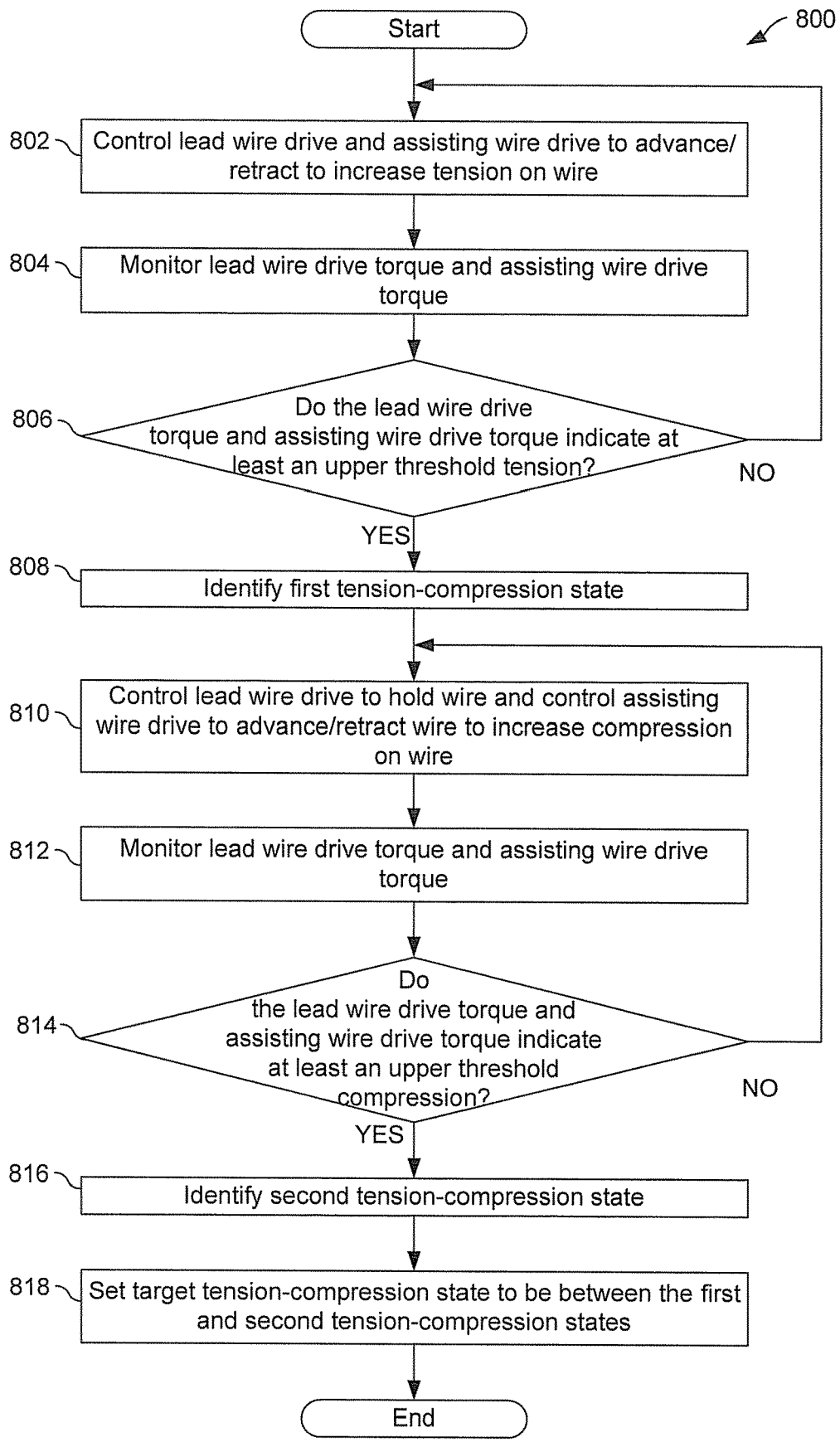
FIG. 8 is a flowchart representative of example machine readable instructions which may be executed to implement the example robotic welding system of FIGS. 2 and/or 6 to set a target tension-compression state of an electrode wire.

FIG. 8 is a flowchart representative of example machine readable instructions 800 which may be executed to implement the example robotic welding system 200 of FIG. 2 to set a target tension-compression state of an electrode wire 202. The example instructions 800 may be performed to implement block 502 of FIG. 5.

At block 802, the motor controllers 220, 222 controls the lead wire drive 210 and the assisting wire drive 212 to advance and/or retract the electrode wire 202 to increase the tension on the electrode wire 202. For example, the assisting wire drive 212 may retract the wire and the lead wire drive 210 may feed the wire forward, thereby increasing the tension on the electrode wire 202. At block 804, the motor torque monitor 234 monitors the torque of the lead wire drive 210 and the torque of the assisting wire drive 212. For example, the motor torque monitor 234 may monitor the motor currents in the wire drives 210, 212.

A block 806, the motor torque monitor 234 determines whether the lead wire drive torque and the assisting wire drive torque indicate an upper threshold tension on the electrode wire 202. If the lead wire drive torque and the assisting wire drive torque do not indicate at least an upper threshold tension on the electrode wire 202 (block 806), control returns to block 802. On the other hand, when the lead wire drive torque and the assisting wire drive torque indicate at least an upper threshold tension on the electrode wire 202 (block 806), at block 808 the tension-compression detector 232 identifies a first tension-compressions state of the electrode wire 202. For example, the tension-compression detector 232 may determine that the ones of the sensors 306-318 of FIG. 3A that are blocked by the marker 304 indicate the first tension-compression state.

At block 810, the motor controllers 220, 222 control the lead wire drive 210 and the assisting wire drive 212 to advance and/or retract the electrode wire 202 to increase the compression on the wire (and/or decrease the tension on the electrode wire 202). At block 812, the motor torque monitor 234 monitors the torque of the lead wire drive 210 and the torque of the assisting wire drive 212. Block 812 may be performed in a manner similar to block 804.

At block 814, the motor torque monitor 234 determines whether the lead wire drive torque and the assisting wire drive torque indicate an upper threshold compression on the electrode wire 202. If the lead wire drive torque and the assisting wire drive torque do not indicate at least an upper threshold compression on the electrode wire 202 (block 814), control returns to block 810. When the lead wire drive torque and the assisting wire drive torque indicate at least the upper threshold compression on the electrode wire 202 (block 814), at block 816 the tension-compression detector 232 identifies a second tension-compression state of the electrode wire 202. For example, the tension-compression detector 232 may determine that the ones of the sensors 306-318 of FIG. 3A that are blocked by the marker 304 indicate the second tension-compression state.

At block 818, the tension-compression detector 232 sets the target tension-compression state to be between the first and second tension-compression states. For example, the tension-compression detector 232 may determine that one of the sensors 306-318 corresponds to a target tension-compression state, such as a substantially neutral tension-compression state. In some examples, the tension-compression detector 232 uses an average or weighted average of the first and second tension-compression states to determine the target tension-compression state.

After setting the target tension-compression state, the example instructions 800 end and return control to a calling function, such as block 502 of FIG. 5.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
    a first wire drive configured to feed an electrode wire through a welding torch;
    a bidirectional assisting wire drive configured to advance the electrode wire from a wire supply to the first wire drive;
    a tension-compression detector configured to detect a state of a portion of the electrode wire between the first wire drive and the assisting wire drive, the tension-compression detector configured to select the detected state from: a tension state, a compression state, and a neutral tension-compression state; and
    one or more motor controllers configured to control the first wire drive and the assisting wire drive to put the electrode wire in a predetermined position relative to the welding torch by:
        controlling the first wire drive to hold the electrode wire in a stationary position; and
        controlling the assisting wire drive to, while the first wire drive is holding the electrode wire, advance or retract the electrode wire based on the detected one of the tension state, the compression state, or the neutral tension-compression state to put the electrode wire in a predetermined tension-compression state.

2. The welding-type system as defined in claim 1, further comprising a motor torque monitor configured to monitor a motor torque at one or more of the first wire drive or the assisting wire drive, the one or more motor controllers configured to identify the second tension-compression state based on the motor torque.

3. A welding-type system comprising:
    a first wire drive configured to feed an electrode wire through a welding torch;
    a bidirectional assisting wire drive configured to advance the electrode wire from a wire supply to the first wire drive;
    a tension-compression detector configured to detect a first tension-compression state of the electrode wire;
    a tension-compression sensor coupled to the tension-compression detector, the tension-compression sensor comprising:
        a marker physically coupled to a wire liner of the electrode wire;
        one or more first sensors configured to detect corresponding amounts of compression in the electrode wire when the one or more first sensors detect the marker; and one or more second sensors configured to detect corresponding amounts of tension in the electrode wire when the one or more second sensors detect the marker, the tension-compression state being based on output values of the one or more first sensors and the one or more second sensors; and one or more motor controllers configured to control the first wire drive and the assisting wire drive to put the electrode wire in a predetermined position relative to the welding torch by:

controlling the first wire drive to hold the electrode wire; and controlling the assisting wire drive to advance or retract the electrode wire based on the first tension-compression state to put the electrode wire in a second tension-compression state.

4. The welding-type system as defined in claim 3, wherein the one or more first sensors and the one or more second sensors comprise at least one of a Hall effect sensor, an optocoupler, a potentiometer, a linear variable differential transformer, an inductive proximity sensor, a rotary encoder, or an incremental encoder.

5. The welding-type system as defined in claim 1, further comprising a robot controller configured to control a movement of the welding torch and to indicate to the one or more motor controllers that the movement of the welding torch between welds is completed, the one or more motor controllers configured to control the first wire drive and the assisting wire drive to put the electrode wire in the predetermined position in response to the indication from the robot controller.

6. The welding-type system as defined in claim 1, further comprising a robot controller configured to control a movement of the welding torch, the one or more motor controllers configured to control the first wire drive and the assisting wire drive to put the electrode wire in the predetermined position and to maintain the electrode wire in the predetermined position while the welding torch is moved.

7. A welding-type system comprising:
a first wire drive configured to feed an electrode wire through a welding torch;
a bidirectional assisting wire drive configured to advance the electrode wire from a wire supply to the first wire drive;
a tension-compression detector configured to detect a first tension-compression state of the electrode wire; and
one or more motor controllers configured to control the first wire drive and the assisting wire drive to put the electrode wire in a predetermined position relative to the welding torch by:
controlling the first wire drive to hold the electrode wire; and
controlling the assisting wire drive to advance or retract the electrode wire based on the first tension-compression state to put the electrode wire in a second tension-compression state, wherein the one or more motor controllers are to identify the second tension-compression state by:
controlling the first wire drive and the assisting wire drive to put the electrode wire into a third tension-compression state based on the tension-compression detector, the third-tension compression state comprising an upper compression detection limit of the tension-compression detector;
controlling the first wire drive to hold the electrode wire;

controlling the assisting wire drive to retract the electrode wire and advance the electrode wire;
while retracting and advancing the electrode wire, monitoring a wire drive torque for the assisting wire drive to determine whether the wire drive torque satisfies a wire drive torque threshold;
identifying tension compression-states corresponding to tension in the electrode wire and compression in the electrode wire by identifying the tension-compression states when the wire drive torque satisfies the wire drive torque threshold; and
setting the second tension-compression state to be between the tension-compression states associated with the wire drive torque satisfying the wire drive torque threshold.

8. The welding-type system as defined in claim 1, wherein the one or more motor controllers are configured to, when the electrode wire is in the second tension-compression state, control the first wire drive and the assisting wire drive to advance or retract the electrode wire to set the electrode wire to a first stickout distance at the welding torch and to have the second tension-compression state.

9. The welding-type system as defined in claim 1, wherein the one or more motor controllers are configured to detect an end of an electrode wire supply based on detecting a change the first tension-compression state without a change in a characteristic of a wire drive torque of the assisting wire drive.

10. The welding-type system as defined in claim 1, wherein the tension-compression detector is coupled to a wire liner adjacent to the assisting wire drive or the first wire drive.

11. A welding-type system, comprising:
a first wire drive configured to feed an electrode wire to a welding torch;
an assisting wire drive configured to advance the electrode wire from a wire supply to the first wire drive;
a wire drive monitor configured to monitor a characteristic of at least one of the first wire drive or the assisting wire drive; and
one or more motor controllers configured to control the first wire drive and the assisting wire drive configured to put the electrode wire in a predetermined position relative to the welding torch by:
controlling the first wire drive to hold the electrode wire in a stationary position; and
while controlling the first wire drive to hold the electrode wire in the stationary position, controlling the assisting wire drive to advance or retract the electrode wire based on the characteristic of the assisting wire drive to put the electrode wire into a known tension-compression state.

12. The welding-type system as defined in claim 11, wherein the wire drive monitor comprises a motor torque monitor configured to monitor a motor torque at the assisting wire drive, the one or more motor controllers configured to identify the known tension-compression state based on the motor torque.

13. The welding-type system as defined in claim 12, wherein the motor torque monitor is configured to monitor the motor torque by measuring motor current at the assisting wire drive.

14. The welding-type system as defined in claim 11, further comprising a robot controller configured to control a movement of the welding torch and to indicate to the one or more motor controllers that the movement of the welding torch between welds is completed, the one or more motor controllers configured to control the first wire drive and the assisting wire drive to put the electrode wire in the predetermined position in response to the indication from the robot controller.

15. The welding-type system as defined in claim 11, further comprising a robot controller configured to control a movement of the welding torch, the one or more motor controllers configured to control the first wire drive and the assisting wire drive to put the electrode wire in the predetermined position and to maintain the electrode wire in the predetermined position while the welding torch is moved.

16. The welding-type system as defined in claim 11, wherein the one or more motor controllers are configured to, when the electrode wire is in the known tension-compression state, control the first wire drive and the assisting wire drive to advance or retract the electrode wire to set the electrode wire to a first stickout distance at the welding torch and to have the second tension-compression state.

17. The welding-type system as defined in claim 11, wherein the one or more motor controllers are configured to detect an end of an electrode wire supply based on detecting a change in the first tension-compression state without a change in a commanded speed of the assisting wire drive.

18. The welding-type system as defined in claim 11, wherein the characteristic comprises at least one of torque, drive current, motor velocity, motor position, or a motor velocity error.

* * * * *